(12) United States Patent
Arisato

(10) Patent No.: US 6,564,829 B2
(45) Date of Patent: May 20, 2003

(54) QUICK COUPLER

(75) Inventor: Akira Arisato, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 10/140,605

(22) Filed: May 7, 2002

(65) Prior Publication Data

US 2002/0179160 A1 Dec. 5, 2002

(30) Foreign Application Priority Data

May 29, 2001 (JP) ......................................... 2001-160152

(51) Int. Cl.7 ............................................. F16L 37/28
(52) U.S. Cl. .................... 137/614.03; 137/550; 137/545
(58) Field of Search ....................... 137/614.03, 614.04, 137/614.05, 545, 549, 550

(56) References Cited

U.S. PATENT DOCUMENTS

| | | | | |
|---|---|---|---|---|
| 3,910,307 A | * | 10/1975 | Jankowski | ............... 137/550 X |
| 4,971,107 A | | 11/1990 | Yonezawa | |
| 5,462,084 A | | 10/1995 | Arisato | |
| 5,951,728 A | * | 9/1999 | Hopson | ................... 137/545 X |
| 6,116,274 A | * | 9/2000 | Ehrlich | ................... 137/550 X |
| 6,390,126 B1 | * | 5/2002 | Kimura | ................. 137/614.04 |

FOREIGN PATENT DOCUMENTS

JP 3-47975 B2 7/1991

* cited by examiner

*Primary Examiner*—Kevin Lee
(74) *Attorney, Agent, or Firm*—Akin, Gump, Strauss, Hauer & Feld, L.L.P.

(57) ABSTRACT

A socket (A) includes a first flow passage (4) which is provided with a first closure member (14) and a first check member (32). And a plug (B) includes a second flow passage (54) which is provided with a second closure ember (64) and a second check member (82). The second check member (82) comprises a larger-diameter member (86) and a smaller-diameter member (88). A first cylindrical filter (20) is arranged on an outer periphery of the first closure member (14). A second cylindrical filter (37) is arranged on an outer periphery of the first check member (32). A third cylindrical filter (70) is arranged on an outer periphery of the second closure member (64). Each of the cylindrical filters (20), (37) and (70) comprises an inner perforated sheet (41), a screen (42) and an outer perforated sheet (43) arranged in the mentioned order from an interior area.

10 Claims, 4 Drawing Sheets

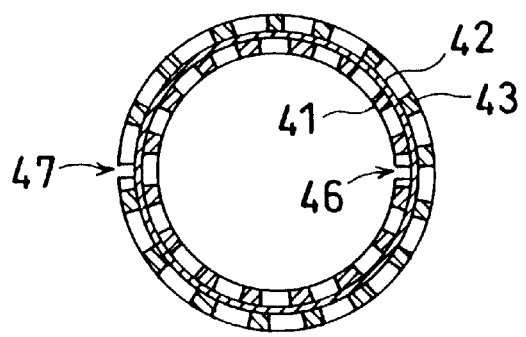
F I G. 4 (B)
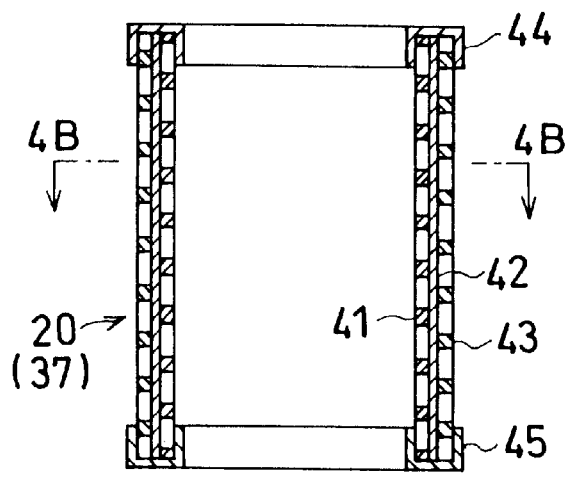
F I G. 4 (A)
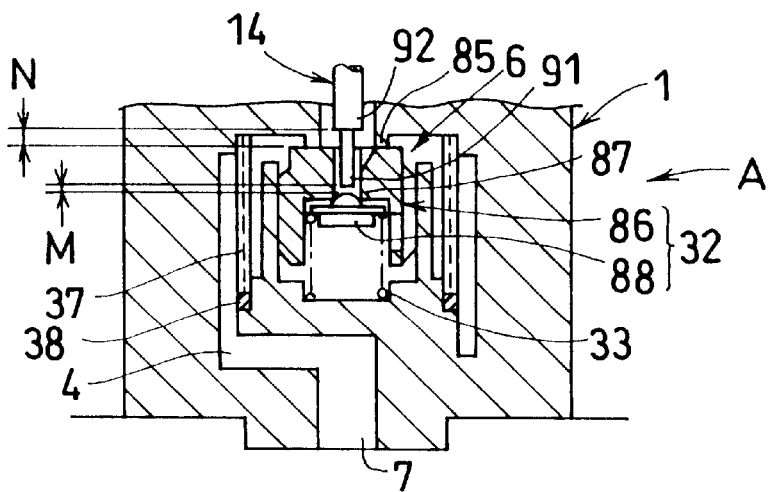
F I G. 5

QUICK COUPLER

BACKGROUND OF THE INVENTION

1. Field of the Invention

The present invention relates to a quick coupler which is used for connecting or disconnecting a halfway portion of a pressure line such as a hydraulic oil line.

2. Explanation of the Related Art

There is a conventional example of the quick coupler of this kind disclosed in Japanese Patent Publication No. 3-47975.

The conventional technique inserts rod-like closure members into a socket and a plug, respectively. And check members are provided in series with the respective closure members. A disk-like filter made of a sintered metal is arranged on an outer periphery of each of the closure members. Pressurized oil or the like fluid is made to pass axially of the disk-like filter.

According to the conventional technique, it is required to reduce a diameter of the disk-like filter so as to make the quick coupler compact. This entails a problem that the disk-like filter decreases its filtering area to result in enlarging a flow resistance of the fluid. In order to solve the problem, it may be sufficient to increase a filtration grading of the disk-like filter. However, in this case, there is a likelihood that large foreign matters which have passed through the disk-like filter might damage a checking performance of the check member.

Further, the conventional technique had another problem that when butting the two closure members against each other to forcedly open the check members, it required a large operational force for butting them.

SUMMARY OF THE INVENTION

The present invention has an object to provide a quick coupler which has a small flow resistance and a good checking performance. Further, the present invention has another object making it possible to decrease the operational force required when butting the two closure members against each other.

In order to accomplish the above object, the present invention has constructed a quick coupler in the following manner.

A first coupling includes a first flow passage and a second coupling includes a second flow passage. Rod-like closure members are inserted into the first flow passage and the second flow passage, respectively. A check member is provided in series with the closure member in at least one of the first flow passage and the second flow passage. The at least one of the flow passages has a halfway portion where a cylindrical filter is attached in an annular space defined on an outer periphery of the closure member. The cylindrical filter comprises an inner perforated sheet, a screen and an outer perforated sheet arranged in the mentioned order from an interior area.

The present invention offers the following advantage.

The cylindrical filter is arranged in the annular space defined on the outer periphery of the closure member. Therefore, pressurized oil or the like fluid passes through the screen of the cylindrical filter radially, thereby enabling the screen to secure a large filtering area. This makes it possible to reduce the flow resistance of the fluid which passes through the screen and at the same time to decrease the filtration grading of the screen. In consequence, large foreign matters are inhibited from passing through the screen to result in being able to keep the checking performance of the check member in a good condition.

The above construction could provide a quick coupler which has a small flow resistance and a good checking performance. In addition, the perforated sheets are arranged on both an inner side and an outer side of the screen. Owing to this arrangement, the quick coupler can attend-to two way flows each of which is caused in a case where pressurized fluid flows from an inner side of the cylindrical filter to an outer side thereof (an internal pressure acts on the filter) or in another case where pressurized fluid flows from the outer side of the cylindrical filter to the inner side thereof (an external pressure acts on the filter).

The present invention includes the following quick coupler.

Another cylindrical filter is attached at a halfway portion of the at least one of the flow passages and in an annular space defined on an outer periphery of the check member. The cylindrical filter comprises the inner perforated sheet, the screen and the outer perforated sheet arranged in the mentioned order from the interior area. In this case, it is possible to arrange on both of an inlet side and an outlet side of the check member, the cylindrical filters according to the present invention. This can keep the checking performance of the check member in a better condition.

The present invention further includes the following quick coupler.

The inner perforated sheet, the screen and the outer perforated sheet are overlaid or laminated one on another in the mentioned order from the interior area to thereby form a pipe-like overlaid body. The overlaid body has its opposite ends fixed by ring members each of which is U-shaped when seen in section. In this case, the cylindrical filter can be readily manufactured.

Moreover, in order to accomplish the another object, the present invention has constructed a quick coupler in the following manner.

Two closure members are arranged within a first housing of a first coupling and within a second housing of a second coupling, respectively, so that they can butt against each other. A check member is provided in at least one of the first housing and the second housing. The check member comprises a member of a larger diameter and a member of a smaller diameter. The larger-diameter member and the smaller-diameter member are brought into contact with a valve seat of a larger diameter and with a valve seat of a smaller diameter provided in the larger-diameter member, respectively. One of the closure members, which corresponds to the check member, is provided with a first pushing portion and a second pushing portion. The first pushing portion faces the smaller-diameter member with a first contact gap interposed therebetween. The second pushing portion opposes to the larger-diameter member with a second gap interposed therebetween. The first contact gap has a dimension set to a value smaller than that of a dimension of the second contact gap. The two closure members are brought into butting contact with each other, thereby primarily enabling the first push portion to separate the smaller-diameter member from the smaller-diameter valve seat and then allowing the second push portion to separate the larger-diameter member from the larger-diameter valve seat.

The foregoing invention offers the following advantage.

When connecting the first coupling and the second coupling to each other, the two closure members are brought into butting contact with one another. Then, primarily, the first push portion separates the smaller-diameter member from the smaller-diameter valve seat, against a small valve-closing force which acts on the smaller-diameter member having a smaller pressure receiving area. Thus a check valve chamber of at least one of the first coupling and the second coupling is deprived of its pressure. This decreases a valve-closing pressure which acts on the larger-diameter member and therefore also reduces a pushing force required when the second push portion separates the larger-diameter member from the larger-diameter valve seat, with the result of reducing the operational force for butting the two closure members against each other.

The present invention still further includes the following quick coupler.

The smaller-diameter valve seat is provided within the larger-diameter member and the smaller-diameter member is inserted thereinto. There is provided a resilient member for urging the smaller-diameter member to the smaller-diameter valve seat. The resilient member exerts an urging force which brings the larger-diameter member into contact with the larger-diameter valve seat through the smaller-diameter member. In this case, the check valve is made compact to result in forming the quick coupler into a structure of small size.

BRIEF DESCRIPTION OF THE DRAWINGS

FIG. 1 to FIGS. 4(A) and 4(B) show an embodiment of the present invention;

FIG. 1 is a schematic view, when seen in vertical section, of a quick coupler as it is disconnected;

FIG. 2 is a schematic view showing the quick coupler when it starts a connection;

FIG. 3 is a schematic view showing the quick coupler when it has completed the connection;

FIG. 4(A) is a schematic view, when seen in vertical section, of a cylindrical filter attached to the quick coupler;

FIG. 4(B) is a sectional view when seen along a line 4B—4B in FIG. 4(A) in a direction indicated by arrows; and FIG. 5 shows a modification of a socket of the quick coupler and is a partial view similar to FIG. 1.

DESCRIPTION OF THE PREFERRED EMBODIMENTS

Hereafter, an embodiment of the present invention is explained by relying on FIGS. 1 to 4.

Figure 1:
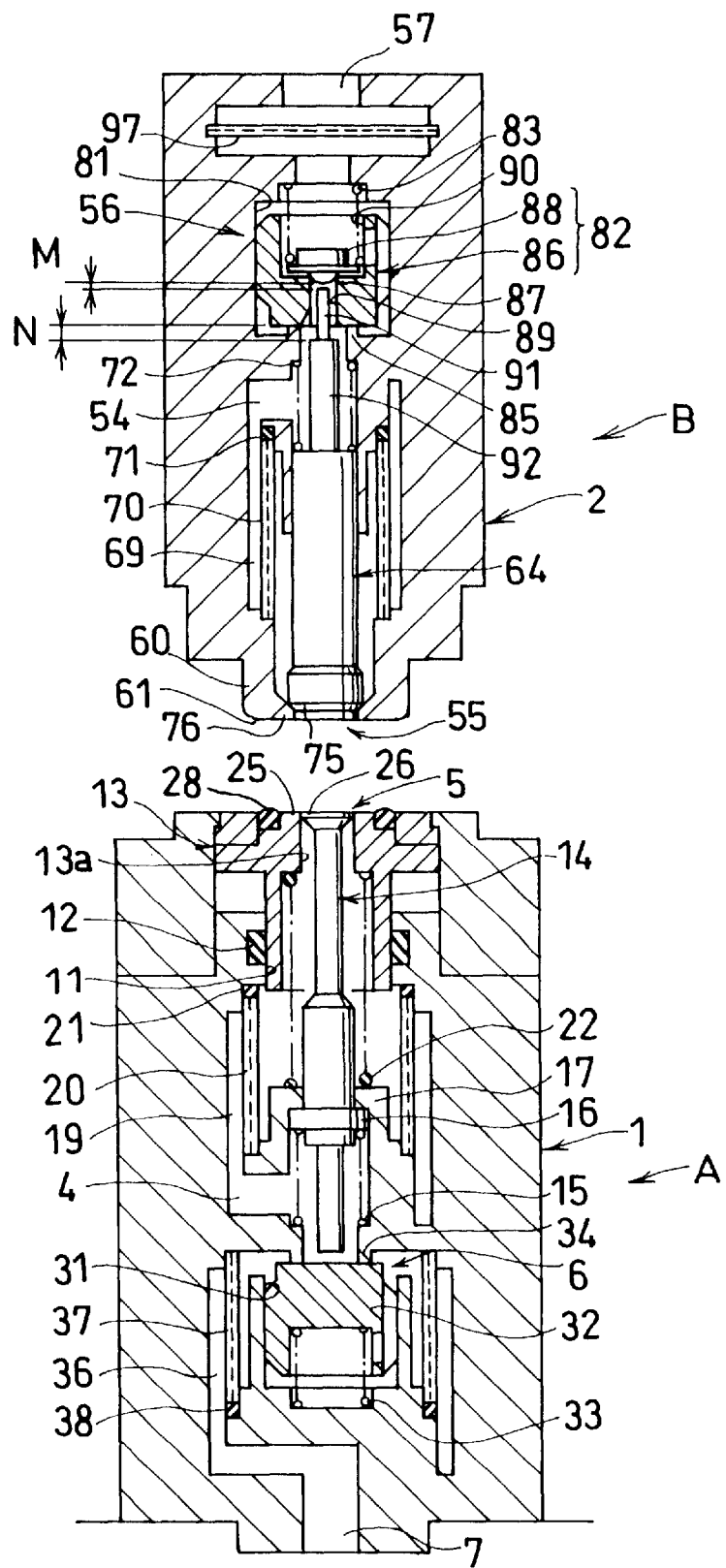

First, explanation is given for a structure of a quick coupler according to the present invention by resorting to FIG. 1. FIG. 1 is a schematic view, when seen in vertical section, showing the quick coupler as it is disconnected.

The quick coupler is a coupling for supplying or discharging pressurized oil. And it comprises a socket (A) of a first coupling and a plug (B) of a second coupling. A first housing 1 of the socket (A) and a second housing 2 of the socket (B) are arranged so that they vertically oppose to each other substantially on the same axis.

The socket (A) is constructed in the following manner.

Formed within the first housing 1 is a first flow passage 4 which extends vertically. The first flow passage 4 has an upper end provided with a first spill stop valve 5 and has a lower portion provided with a first check valve 6. The first flow passage 4 has a lower end opened to provide a first supply and discharge port 7. The first supply and discharge port 7 can selectively communicate with a hydraulic pump and an oil reservoir (either of which is not shown).

The first spill stop valve 5 is constructed in the following manner.

The first housing 1 has an upper portion formed with a cylindrical hole 11, into which a slide cylinder 13 is inserted vertically movably and hermetically through a sealing member 12. A first rod-like closure member 14 is axially movably inserted into the first flow passage 4 within the slide cylinder 13. The first closure member 14 is urged upwards through a push spring 15 and has a flange 16 received by an annular stop wall 17.

A first cylindrical filter 20 is attached at a vertical middle portion of the first flow passage 4 and in a first annular space 19 defined on an outer periphery of the first closure member 14. The first cylindrical filter 20 has an upper end sealed by a first resilient sealing member 21.

The slide cylinder 13 is urged upwards through a first advance spring 22. A cylindrical hole 13a of the slide cylinder 13 has an upper end provided with a first valve face 25 which is brought into sealing contact with (or liquid-tightly fits to) a first valve seat 26 at an upper end of the first closure member 14 from below. The first valve face 25 has an outer peripheral wall to which a gasket 28 made of an O-ring is attached.

The first check valve 6 is constructed as follows.

A first check valve chamber 31 is formed in the first flow passage 4 within a lower portion of the first housing 1. A first check member 32 is inserted into the first check valve chamber 31 and is urged to a first check valve seat 34 by a first closing spring (resilient member) 33. A second cylindrical filter 37 is attached to the lower portion of the first flow passage 4 and in a second annular space 36 defined on an outer periphery of the first check valve chamber 31. The second cylindrical filter 37 has a lower end sealed by a second resilient sealing member 38.

The plug (B) is constructed in the following manner.

Formed within the second housing 2 is an second flow passage 54 which extends vertically. The second flow passage 54 has a lower end provided with a second spill stop valve 55 and has an upper portion provided with a second check valve 56. Further, the second flow passage 54 has an upper end opened to provide a second supply and discharge port 57. The second supply and discharge port 57 communicates with a hydraulic cylinder or the like hydraulic actuator (not shown).

The second spill stop valve 55 is constructed in the following manner.

The second housing 2 has a lower portion provided with a push cylinder 60 which faces the slide cylinder 13. The push cylinder 60 has a lower end formed with a sealing surface 61, which is able to be brought into contact with the gasket 28.

A second rod-like closure member 64 is vertically movably inserted into a lower half portion of the second flow passage 54. A third cylindrical filter 70 is attached in a third annular space 69 defined on an outer periphery of the second closure member 64 within the second flow passage 54. The third cylindrical filter 70 has an upper end sealed by a third resilient sealing member 71. Besides, the second closure member 64 is urged downwards by a second advance spring 72. This brings a second valve face 75 at a lower end of the second closure member 64 into sealing contact with (or liquid-tightly fits the second valve face 75 into) a second valve seat 76 at a lower end of an inner peripheral surface of the push cylinder 60 from above.

The second check valve 56 is constructed in the following manner.

A second check valve chamber 81 is formed in the second flow passage 54 within an upper portion of the second housing 2. A second check member 82 is inserted into the second check valve chamber 81.

The second check member 82 comprises a member 86 of a larger diameter and a member 88 of a smaller diameter. The members 86 and 88 are brought into contact with a valve seat 85 of a larger diameter and a valve seat 87 of a smaller diameter, respectively. The smaller-diameter valve seat 87 is provided at an upper end of a communication hole 89 at a lower half portion of the larger-diameter member 86. The smaller-diameter member 88 is inserted into a recess 90 at an upper half portion of the larger-diameter member 86. And a valve-closing resilient force of a second closing spring (resilient member) 83 brings the smaller-diameter member 88 into closing contact with the smaller-diameter valve seat 87 and brings the larger-diameter member 86 into closing contact with the larger-diameter valve seat 85.

Additionally, the second closure member 64 has an upper portion provided with a first push portion 91 and a second push portion 92. The first push portion 91 faces the smaller-diameter member 88 with a first contact gap (M) interposed therebetween. And the second push portion 92 opposes to the larger-diameter member 86 with a second contact gap (N) interposed therebetween. The first contact gap (M) has a dimension set to a value smaller than that of a dimension of the second contact gap (N).

A disk-like filter 97 is attached to the upper portion of the second flow passage 54 between the second check valve chamber 81, and the second supply and discharge port 57.

Figure 2:
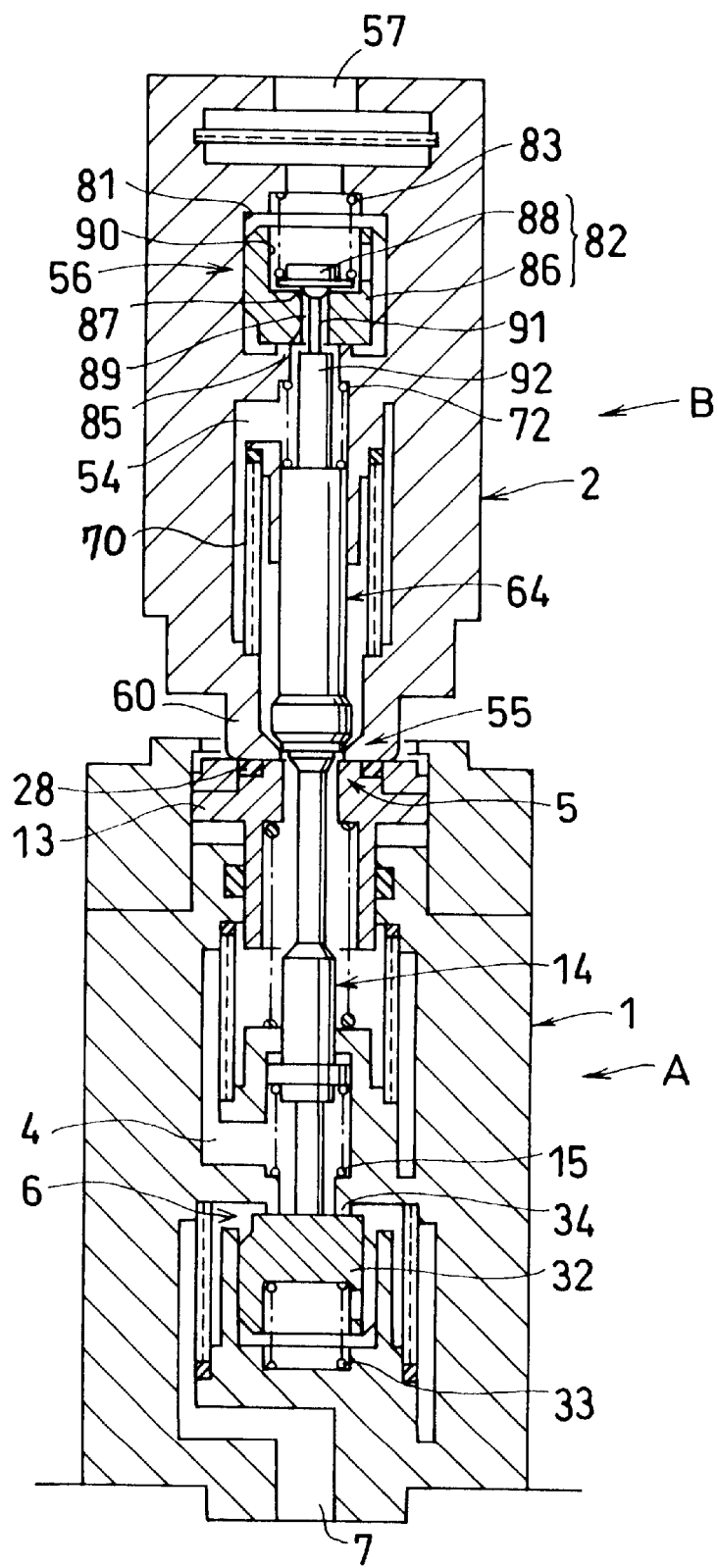
Figure 3:
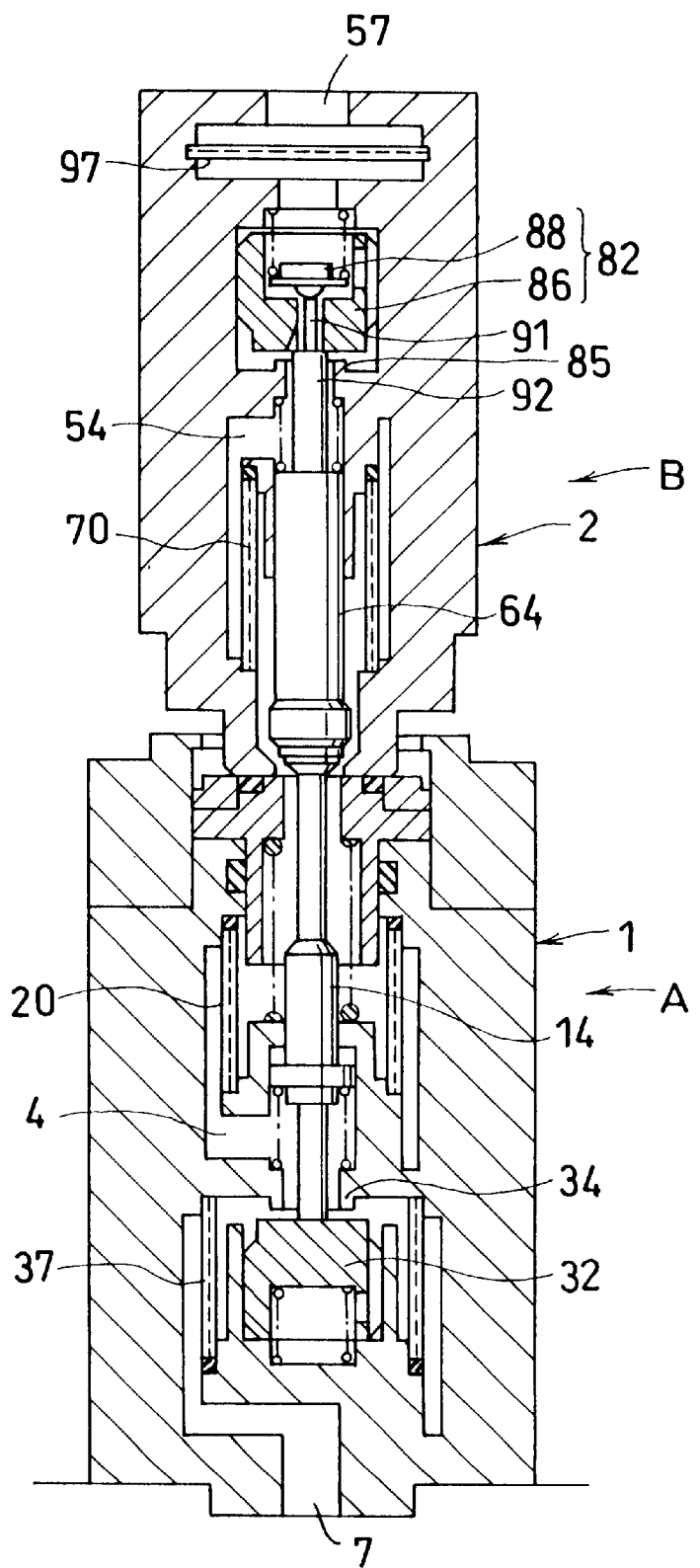

The quick coupler operates in the following manner as shown in FIGS. 1, 2 and 3. FIG. 2 is a schematic view showing a state where the quick coupler starts a connection. And FIG. 3 is a schematic view showing a state where the quick coupler has completed the connection.

In a disconnected state shown by FIG. 1, the first supply and discharge port 7 is connected to an oil reservoir (not shown), thereby maintaining the first flow passage 4 deprived of its pressure (a state of a low pressure or non-pressure). The second supply and discharge port 57 is connected to a hydraulic cylinder or the like hydraulic actuator (not shown), thereby retaining an interior area of the second check valve chamber 81 at a high pressure.

In the state shown by FIG. 1, when a pneumatic cylinder (not shown) lowers the plug (B), it operates as shown in FIG. 2.

More specifically, first, the push cylinder 60 is brought into sealing contact with the gasket 28 and the second closure member 64 has its lower end brought into contact with the upper end of the first closure member 14. Next, the push cylinder 60 retreats the slide cylinder 13 into a lower open position with respect to the first closure member 14 urged upwards by the push spring 15. This opens the first spill stop valve 5. Substantially at the same time, the push cylinder 60 moves downwards with respect to the second closure member 64 received by the first closure member 14, thereby opening the second spill stop valve 55 and brings the first push portion 91 into contact with the smaller-diameter member 88.

Subsequently, the plug (B) descends to place the first closure member 14 and the second closure member 64 in a mutual butting condition. This, first, allows the first push portion 91 to separate the smaller-diameter member 88 from the smaller-diameter valve seat 87. Then highly pressurized oil within the second check valve chamber 81 flows out to the first flow passage 4 via the recess 90, the communication hole 89, the third cylindrical filter 70, an opening gap of the second spill stop valve 55 and an opening gap of the first spill stop valve 5 in the mentioned order. This promptly lowers a pressure of the second check valve chamber 81.

Thereafter, as shown in FIG. 3, the second push portion 92 separates the larger-diameter member 86 from the larger-diameter valve seat 85. Substantially at the same time, a lower end of the first closure member 14 separates the first check member 32 from the first check valve seat 34. This allows a large amount of the pressurized oil within the hydraulic actuator (not shown) to flow out to an upper portion of the first flow passage 4 through a large opening gap of the larger-diameter valve seat 85. The flowed out oil is smoothly discharged into an outside oil reservoir (not shown) through the first cylindrical filter 20, the second cylindrical filter 37, and the first supply and discharge port 7 in the mentioned order.

Conversely, when supplying pressurized oil to the hydraulic actuator (not shown), in the connected state shown by FIG. 3, the first supply and discharge port 7 is connected to a hydraulic pump (not shown). This supplies the pressurized oil within the hydraulic pump to the hydraulic actuator through the first flow passage 4 and the second flow passage 54 in the mentioned order. Thereafter, a pneumatic cylinder (not shown) is going to raise the plug (B). Then, first, as shown in FIG. 2, the first closing spring 33 closes the first check valve 6 and the second closing spring 83 closes the second check valve 56. This inhibits the pressurized oil which has been supplied to the first supply and discharge port 7 from flowing out to an upper half portion of the first flow passage 4 and further prevents the pressurized oil at the second supply and discharge port 57 from flowing out to the lower half portion of the second flow passage 54. Thereafter, as shown in FIG. 1, the first spill stop valve 5 closes and at the same time the second spill stop valve 55 closes, thereby reducing each of pressures at the upper half portion of the first flow passage 4 and at the lower half portion of the second flow passage 54 to a low pressure (or almost non-pressure).

The above-mentioned second cylindrical filter 20, speaking it in more detail, is constructed as shown in FIG. 4(A) and FIG. 4(B). FIG. 4(A) is a schematic view of the cylindrical filter 20 when seen in vertical section. FIG. 4(B) is a sectional view when seen along a line 4B—4B in FIG. 4(A) in a direction indicated by arrows.

An inner perforated sheet 41, a screen 42 and an outer perforated sheet 43 are each formed in the shape of a pipe. These are overlaid or laminated one on another from an interior area in the mentioned order. This overlaid body has vertically opposite ends caulked by ring members 44 and 45 each of which is U-shaped when seen in section. In this case, a butting portion 46 of the inner perforated sheet 41 is circumferentially deviated from a butting portion 47 of the outer perforated sheet 43. In this embodiment, as shown by FIG. 4(B), the two butting portions 46 and 47 are deviated from each other by about 180 degrees. The screen 42 has an overlapping portion (not shown) arranged circumferentially between the two butting portion 46 and 47. In this embodiment, it is staggered by about 90 degrees with respect to the two butting portions 46 and 47.

Moreover, in this embodiment, each of the perforated sheets 41 and 43 is opened at a ratio of about 50% and the screen 42 is formed into a structure of about 400 meshes.

The second cylindrical filter 37 and the third cylindrical filter 70 are also constructed like the first cylindrical filter 20.

FIG. 5 shows a modification of the present invention and is a partial view similar to FIG. 1. In FIG. 5, the second check valve 56 (see FIG. 1) is formed into a parentage structure and in addition the first check valve 6 is formed into the parentage structure as well. In this modification, the same (or similar) constituent members as those of the embodiment are designated, in principle, by the same characters.

More specifically, the first check member 32 comprises the larger-diameter member 86 and the smaller-diameter member 88. The larger-diameter member 86 and the smaller-diameter member 88 are brought into contact with the larger-diameter valve seat 85 and the smaller-diameter valve seat 87, respectively. And a valve-closing resilient force of the first closing spring (resilient member) 33 brings the smaller-diameter member 88 into closing contact with the smaller-diameter valve seat 87 and brings the larger-diameter member 86 into closing contact with the larger-diameter valve seat 85. Besides, the first closure member 14 has a lower portion provided with the first push portion 91 and the second push portion 92. Character (M) indicates the first contact gap and character (N) designates the second contact gap.

The foregoing embodiment and modification can be further modified as follows.

Only the first check valve 6 may be formed into the parentage structure instead of forming both of the two check valves 6, 56 into the parentage structures.

Additionally, either of the two check valves 6, 56 may be omitted.

In the above embodiment, an operational force of the pneumatic cylinder (not shown) approaches the plug (B) to the socket (A), thereby bringing the two closure members 14, 64 into butting contact with each other and subsequently bringing the two closure members 14, 64 into further butting contact with each other to push and open the second check member 82. Instead, after having brought the two closure members 14, 64 into the butting contact with each other, an operational force of another actuator such as another pneumatic cylinder may push at least one of the two closure members 14, 64 to push and open the second check member 82.

The socket (A) may be connected to the plug (B) horizontally or obliquely instead of vertically as exemplified. It may be the socket (A) instead of the exemplified plug (B) that retains its pressure when the quick coupler is disconnected.

The filter 97 of the plug (B) may be constructed in the same manner as the first cylindrical filter 20.

What is claimed is:

1. A quick coupler having a first coupling (A) and a second coupling (B), comprising:
   a first flow passage (4) provided within the first coupling (A);
   a second flow passage (54) provided within the second coupling (B);
   closure members (14, 64) being each formed in the shape of a rod, and being inserted into the first flow passage (4) and the second flow passage (54), respectively;
   a check member (32, 82) provided in series with the closure member (14, 64) in at least one of the first flow passage (4) and the second flow passage (54);
   an annular space (19, 69) defined at a halfway portion of the at least one flow passage (4, 54) and on an outer periphery of the closure member (14, 64); and
   a cylindrical filter (20, 70) attached in the annular space (19, 69) and comprising an inner perforated sheet (41), a screen (42) and an outer perforated sheet (43) arranged in the mentioned order from an interior area.

2. The quick coupler as set forth in claim 1, wherein another annular space (36) is defined at a halfway portion of the at least one flow passage (4, 54) and on an outer periphery of the check member (32), another cylindrical filter (37) being attached in the another annular space (36), the another cylindrical filter (37) comprising the inner perforated sheet (41), the screen (42) and the outer perforated sheet (43) arranged in the mentioned order from the interior area.

3. The quick coupler as set forth in claim 1, wherein the inner perforated sheet (41), the screen (42) and the outer perforated sheet (43) are overlaid one on another in the mentioned order from the interior area to form a pipe-like overlaid body, the overlaid body having its opposite ends fixed by ring members (44, 45) each of which is U-shaped when seen in section.

4. The quick coupler as set forth in claim 1, further comprising:
   the closure members (14, 64) arranged so that they butt against each other;
   the check member (82) comprising a larger-diameter member (86) which is brought into contact with a larger-diameter valve seat, and a smaller-diameter member (88) which is brought into contact with a smaller-diameter valve seat (87) provided in the larger-diameter member (86); and
   a first push portion (91) and a second push portion (92) provided on the closure member (64) of the two closure members (14, 64), which corresponds to the check member (82), the first push portion (91) facing the smaller-diameter member (88) with a first contact gap (M) interposed therebetween, the second push portion (92) opposing to the larger-diameter member (86) with a second gap (N) interposed therebetween, the first contact gap (M) having a dimension set to a value smaller than that of a dimension of the second contact gap (N),
   the two closure members (14, 64) being brought into butting contact with each other, thereby primarily enabling the first push portion (91) to separate the smaller-diameter member (88) from the smaller-diameter valve seat (87) and then allowing the second push portion (92) to separate the larger-diameter member (86) from the larger-diameter valve seat (85).

5. The quick coupler as set forth in claim 4, wherein the smaller-diameter valve seat (87) is provided within the larger-diameter member (86) and the smaller-diameter member (88) is inserted thereinto, there being provided a resilient member (83) which urges the smaller-diameter member (88) to the smaller-diameter valve seat (87), the resilient member (83) exerting an urging force which brings the larger-diameter member (86) into contact with the larger-diameter valve seat (85) through the smaller-diameter member (88).

6. A quick coupler having a first coupling (A) and a second coupling (B), comprising:
   a first closure member (14) inserted into a first housing (1) of the first coupling (A);
   a second closure member (64) inserted into a second housing (2) of the second coupling (B) so that it butts against the first closure member (14);
   a check member (82) comprising a larger-diameter member (86) and a smaller-diameter member (88), and provided within at least one of the first housing (1) and the second housing (2);

a larger-diameter valve seat (85) with which the larger-diameter member (86) is brought into contact;

a smaller-diameter valve seat (87) provided in the larger-diameter member (86) so that the smaller-diameter member (88) is brought into contact therewith; and a first push portion (91) and a second push portion (92) provided on at least one of the first closure member (14) and the second closure member (64) where the check member (82) exists, the first push portion (91) facing the smaller-diameter member (88) with a first contact gap (M) interposed therebetween, the second push portion (92) opposing to the larger-diameter member (86) with a second contact gap (N) interposed therebetween, the first contact gap (M) having a dimension set to a value smaller than that of a dimension of the second contact gap (N), the first closure member (14) being brought into butting contact with the second closure member (64), thereby primarily enabling the first push portion (91) to separate the smaller-diameter member (88) from the smaller-diameter valve seat (87) and then allowing the second push portion (92) to separate the larger-diameter member (86) from the larger-diameter valve seat (85).

7. The quick coupler as set forth in claim 6, wherein the smaller-diameter valve seat (87) is provided within the larger-diameter member (86) and the smaller-diameter member (88) is inserted thereinto, and there is provided a resilient member (83) which urges the smaller-diameter member (88) to the smaller-diameter valve seat (87), the resilient member (83) exerting an urging force which brings the larger-diameter member (86) into contact with the larger-diameter valve seat (85) through the smaller-diameter valve seat (87).

8. The quick coupler as set forth in claim 2, wherein the inner perforated sheet (41), the screen (42) and the outer perforated sheet (43) are overlaid one on another in the mentioned order from the interior area to form a pipe-like overlaid body, the overlaid body having its opposite ends fixed by ring members (44, 45) each of which is U-shaped when seen in section.

9. The quick coupler as set forth in claim 2, further comprising:

the closure members (14, 64) arranged so that they butt against each other;

the check member (82) comprising a larger-diameter member (86) which is brought into contact with a larger-diameter valve seat, and a smaller-diameter member (88) which is brought into contact with a smaller-diameter valve seat (87) provided in the larger-diameter member (86); and a first push portion (91) and a second push portion (92) provided on the closure member (64) of the two closure members (14, 64), which corresponds to the check member (82), the first push portion (91) facing the smaller-diameter member (88) with a first contact gap (M) interposed therebetween, the second push portion (92) opposing to the larger-diameter member (86) with a second gap (N) interposed therebetween, the first contact gap (M) having a dimension set to a value smaller than that of a dimension of the second contact gap (N), the two closure members (14, 64) being brought into butting contact with each other, thereby primarily enabling the first push portion (91) to separate the smaller-diameter member (88) from the smaller-diameter valve seat (87) and then allowing the second push portion (92) to separate the larger-diameter member (86) from the larger-diameter valve seat (85).

10. The quick coupler as set forth in claim 3, further comprising:

the closure members (14, 64) arranged so that they butt against each other;

the check member (82) comprising a larger-diameter member (86) which is brought into contact with a larger-diameter valve seat, and a smaller-diameter member (88) which is brought into contact with a smaller-diameter valve seat (87) provided in the larger-diameter member (86); and a first push portion (91) and a second push portion (92) provided on the closure member (64) of the two closure members (14, 64), which corresponds to the check member (82), the first push portion (91) facing the smaller-diameter member (88) with a first contact gap (M) interposed therebetween, the second push portion (92) opposing to the larger-diameter member (86) with a second gap (N) interposed therebetween, the first contact gap (M) having a dimension set to a value smaller than that of a dimension of the second contact gap (N), the two closure members (14, 64) being brought into butting contact with each other, thereby primarily enabling the first push portion (91) to separate the smaller-diameter member (88) from the smaller-diameter valve seat (87) and then allowing the second push portion (92) to separate the larger-diameter member (86) from the larger-diameter valve seat (85).

* * * * *